(12) United States Patent
Kotary et al.

(10) Patent No.: US 12,190,177 B2
(45) Date of Patent: Jan. 7, 2025

(54) PROCESSOR RESTART USING FIRMWARE BOOT FROM VOLATILE MEMORY

(71) Applicant: Microsoft Technology Licensing, LLC, Redmond, WA (US)

(72) Inventors: Karunakara Kotary, Vancouver, WA (US); Mallik Bulusu, Bellevue, WA (US); Michael Alan Kubacki, Lakewood Ranch, FL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 18/325,830

(22) Filed: May 30, 2023

(65) Prior Publication Data
US 2024/0403149 A1    Dec. 5, 2024

(51) Int. Cl.
  *G06F 9/54* (2006.01)
  *G06F 9/44* (2018.01)
  *G06F 9/4401* (2018.01)

(52) U.S. Cl.
  CPC .......... *G06F 9/544* (2013.01); *G06F 9/4405* (2013.01)

(58) Field of Classification Search
  CPC ............................ G06F 9/544; G06F 9/4405
  See application file for complete search history.

(56) References Cited

U.S. PATENT DOCUMENTS

| | | | |
|---|---|---|---|
| 5,694,583 A * | 12/1997 | Williams | G06F 9/4406 703/24 |
| 6,078,541 A | 6/2000 | Kitagawa et al. | |
| 7,519,805 B2 | 4/2009 | Krauss | |
| 8,209,763 B2 | 6/2012 | Henry et al. | |
| 2011/0047365 A1 | 2/2011 | Hentosh | |
| 2012/0023319 A1 * | 1/2012 | Chin | G06F 9/4418 718/1 |
| 2018/0032349 A1 * | 2/2018 | Bhimanadhuni | G06F 9/4406 |
| 2018/0158527 A1 | 6/2018 | Confalonieri et al. | |

FOREIGN PATENT DOCUMENTS

| | | |
|---|---|---|
| EP | 2761476 B1 | 8/2014 |
| WO | 2005002060 A2 | 1/2005 |

OTHER PUBLICATIONS

Brown, Benjamin B. , "Over-the-Air (OTA) Updates in Embedded Microcontroller Applications: Design Trade-Offs and Lessons Learned", In Analog Dialogue Technical Journal, vol. 52, Nov. 2018, 7 Pages.
International Search Report and Written Opinion received for PCT Application No. PCT/US2024/026928 Jul. 24, 2024, 13 pages.

* cited by examiner

Primary Examiner — Stefan Stoynov
(74) Attorney, Agent, or Firm — Holzer Patel Drennan

(57) ABSTRACT

The described technology provides a method including reserving a portion of a volatile memory on a system on chip (SOC) including one or more processors, decompressing at least a portion of the firmware code from a non-volatile memory; programming one or more volatile memory access control registers to remove write access to the reserved portion of the volatile memory, programming a memory activation table (MAT), wherein the MAT includes a set of memory access controller register addresses and values of the memory access controller register addresses, and communicating an address of the reserved portion of the volatile memory and the MAT to a trusted execution engine (TEE) on the SOC.

20 Claims, 5 Drawing Sheets

PROCESSOR RESTART USING FIRMWARE BOOT FROM VOLATILE MEMORY

BACKGROUND

Modern computing systems using virtual machines sometimes have to meet stringent timeout requirements to avoid any blackouts or customer workloads. In various implementations using virtual machine preserved host updates (VM-PHU), any firmware implementation that may save a few seconds of boot time adds a significant value to scale the VM-PHU across varied hardware configuration with varied number of processor socket designs with varied memory modules and discrete expansion cards.

SUMMARY

The described technology provides a method including reserving a portion of a volatile memory on a system on chip (SOC) including one or more processors, decompressing at least a portion of the firmware code from a non-volatile memory; programming one or more volatile memory access control registers to remove write access to the reserved portion of the volatile memory, programming a memory activation table (MAT), wherein the MAT includes a set of memory access controller register addresses and values of the memory access controller register addresses, and communicating an address of the reserved portion of the volatile memory and the MAT to a trusted execution engine (TEE) on the SOC.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
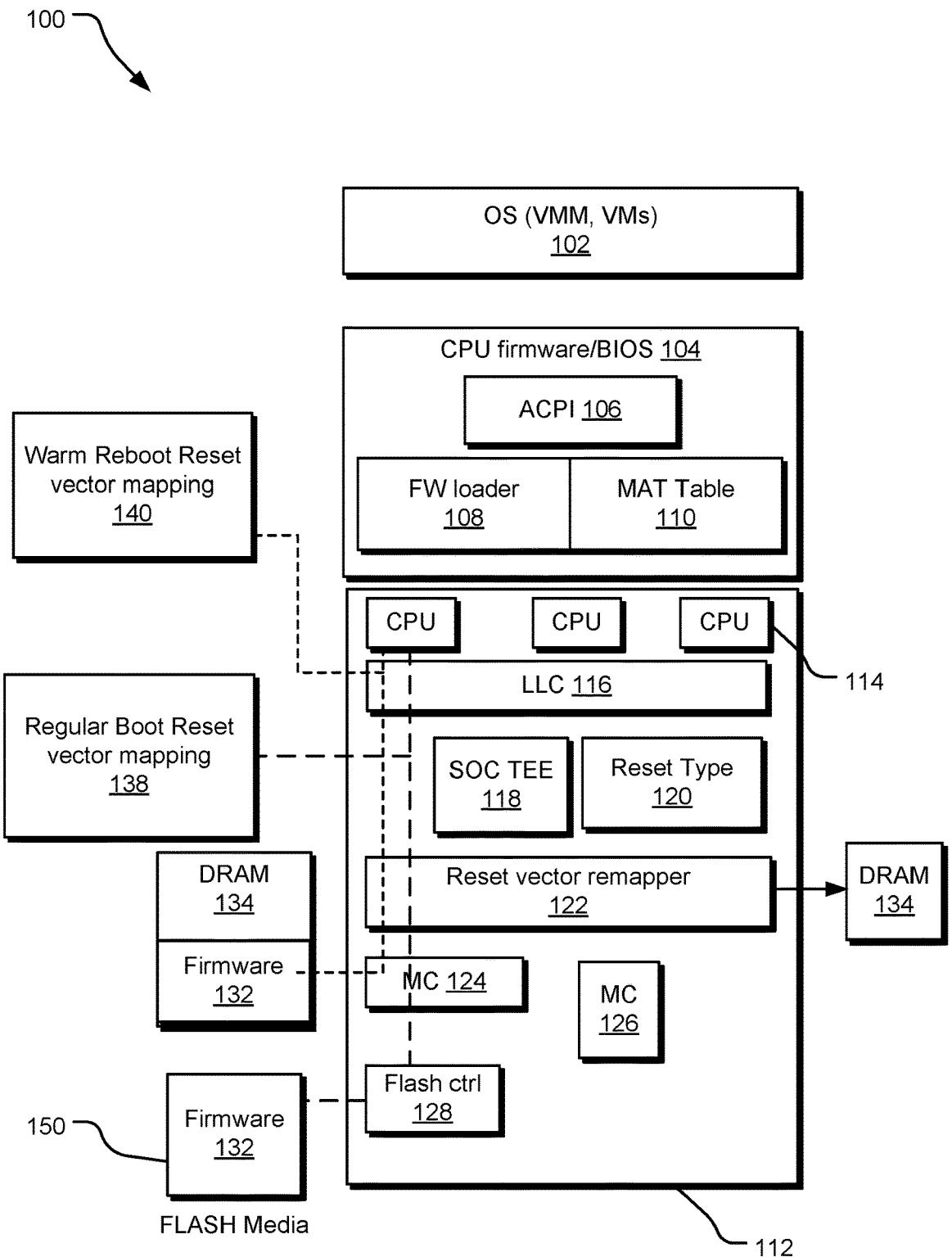
FIG. 1 illustrates an implementation of a processor restart management system 100 disclosed herein.

Data centers deploying virtual machine preserved host update (VM-PHU) may have stringent TCP IP timeout to meet to avoid blackouts to the customer workloads. As part of virtual machine, host processors (CPU) firmware (FW) basic input-output systems (BIOS) may be a primary target of update. Activating a new CPU FW/BIOS across warm reset and rebooting back to operating system (OS), unfreeze OS & VMs phases stringent challenges in providing the consistent boot time of <=30 s. Any firmware innovation that may allow saving a few seconds of boot time may provide big value add to scale the VM-PHU across varied hardware configuration with varied number of CPU socket designs with varied memory modules, and discrete interface cards.

A large portion of firmware boot time is consumed in fetching content whether code or data from non-volatile Flash Media and decompressing the code to DRAM and approximately 20% boot is spent over here.

In various implementations using virtual machine preserved host updates (VM-PHU), any firmware implementation that may save a few seconds of boot time adds a significant value to scale the VM-PHU across varied hardware configuration with varied number of processor socket designs with varied memory modules and discrete expansion cards including PCI Express (PCIe) or compute express link (CXL) cards. A large portion of firmware boot time is consumed in fetching content, whether code or data, from non-volatile flash media (SPI NOR or NAND) and decompressing the code to volatile memory such as DRAM.

The technology disclosed herein relates to using firmware from volatile memory on warm restart of host processors. The technology allows for warm restart of processors more efficiently and quickly so that the processors that are used in virtual machine (VM) environments are capable of meeting stringent boot time requirements. Specifically, the technology disclosed herein leverages the capabilities provided by warm reset to prevent firmware code/data fetches from flash on the boot path. As a result, the implementations disclosed herein fetches the CPU firmware and basic input output system (BIOS) code straight from DRAM right at reset, avoids decompression, and also boots the entire code from large last level cache (LLC) to save significant boot time.

Specific implementations disclosed herein illustrates a CPU BIOS reserving a portion of volatile memory (memory pages) for firmware used for warm reset and copying decompressed firmware from flash media to the reserved portion of the volatile memory. In an alternative implementation, the decompressed firmware in the volatile memory is also decrypted, if necessary. For example, the volatile memory may be DRAM such as DDR5 DRAM. Subsequently, the BIOS secures the reserved memory pages and communicates the address of the reserved memory pages on the volatile memory by (a) writing a register on the processor and (b) communicating a memory activation table (MAT) to a trusted execution environment (TEE). For example, the MAT may be a table with pairs of memory controller register addresses and their values. The TEE may use the MAT to access the firmware stored on the volatile memory and to execute a fast reset of the processors using such firmware.

Specifically, in the illustrated implementations, boot flow on a system on chip (SOC) fetches firmware code that is persisted in secure volatile memory and moves the entire firmware code to the CPU LLC to avoid fetching any firmware from flash media during boot. The boot flow may rely on the BIOS to decompress and/or decrypt full firmware to secure memory region and publish a DRAM activation table to SOC. Subsequently, the SOC may activate DRAM access early in boot flow and remap the reset vector to the DRAM, fetch all code from DRAM, load to LLC, and boot.

FIG. 1 illustrates an example implementation of a processor restart management system 100 disclosed herein. The processor restart management system 100 includes an SOC 112 configured to communicate with CPU firmware/BIOS 104. The CPU firmware/BIOS 104 may include code for a host CPU processor firmware and BIOS code that initializes various CPUs 114 on the SOC 112, and securely boots an operating system (OS) 102. The OS 102 may include an OS for a virtual machine (VM) and a virtual machine manager (VMM). In one implementation, the OS may be a bare metal OS or VMM/VM with guest OS and patch firmware and initiates special fast warm reset to activate firmware across reset. The CPUs 114 represent host processor cores and there can be numerous cores on a SOC 112. For example, in case of a server design these CPUs 112 may be from one socket or from multiple sockets.

The SOC 112 may also be communicatively connected to a FLASH media 150 that stores firmware 132. Specifically, the FLASH media 150 is the non-volatile storage for firmware code and data, used by the CPUs 114 to fetch the firmware 132 during AC/DC boot. In one implementation, the CPUs 114 uses a flash controller 128 to access the firmware 132. The DRAM 134 may be a double data rate (DDR) type DRAM or other volatile storage that hosts the firmware 132 on warm reset like boot. The CPUs 114 use a memory controller (MC) 126 to access the firmware 132 from the DRAM 134.

The SOC 112 may also have a reset vector remapper 122 that maps SOC reset to either the FLASH media 150 or to the DRAM 134. Furthermore, the SOC 112 may also include a SOC trusted execution engine (TEE) 118 which initiates SOC early secure boot flow. Specifically, the TEE 118 uses reset type 120 stored on the SOC 112, where the reset type 120 signals the SOC the type of reset and signals SOC TEE 118 and the reset vector remapper 122 to map a reset vector of the CPUs 114 to DRAM 134 or to the flash media 150. The SOC 112 also includes a last level cache (LLC) 116 that may be shared by all CPUs 114. In one implementation, the LLC 116 may hold the full firmware image on a warm reset to speed up the firmware boot. In one implementation the LLC 116 may store warm reboot reset vector mapping 140 during a warm reboot when the firmware is fetched from the DRAM 134. Alternatively, the LLC 116 may store a regular boot reset vector mapping 138 during a regular boot when the firmware is fetched from the FLASH media 150.

A firmware loader 108 may be part of BIOS 104 and may be responsible for loading the firmware 132 from flash media 150 to BIOS 104 and decompressing its image. In one implementation, the firmware loader 108 may also decrypt the decompressed image of the firmware 132. Furthermore, a memory allocation table (MAT) 110 may hold the register/configuration value, which may be prepared by the BIOS 104 and fed to SOC TEE 118 to setup the path to the DRAM 134 very early in a boot phase. The BIOS 104 may also include an advanced configuration and power interface (ACPI) table 106 that exposes the reset type value/reset register to the OS 102.

Figure 2:
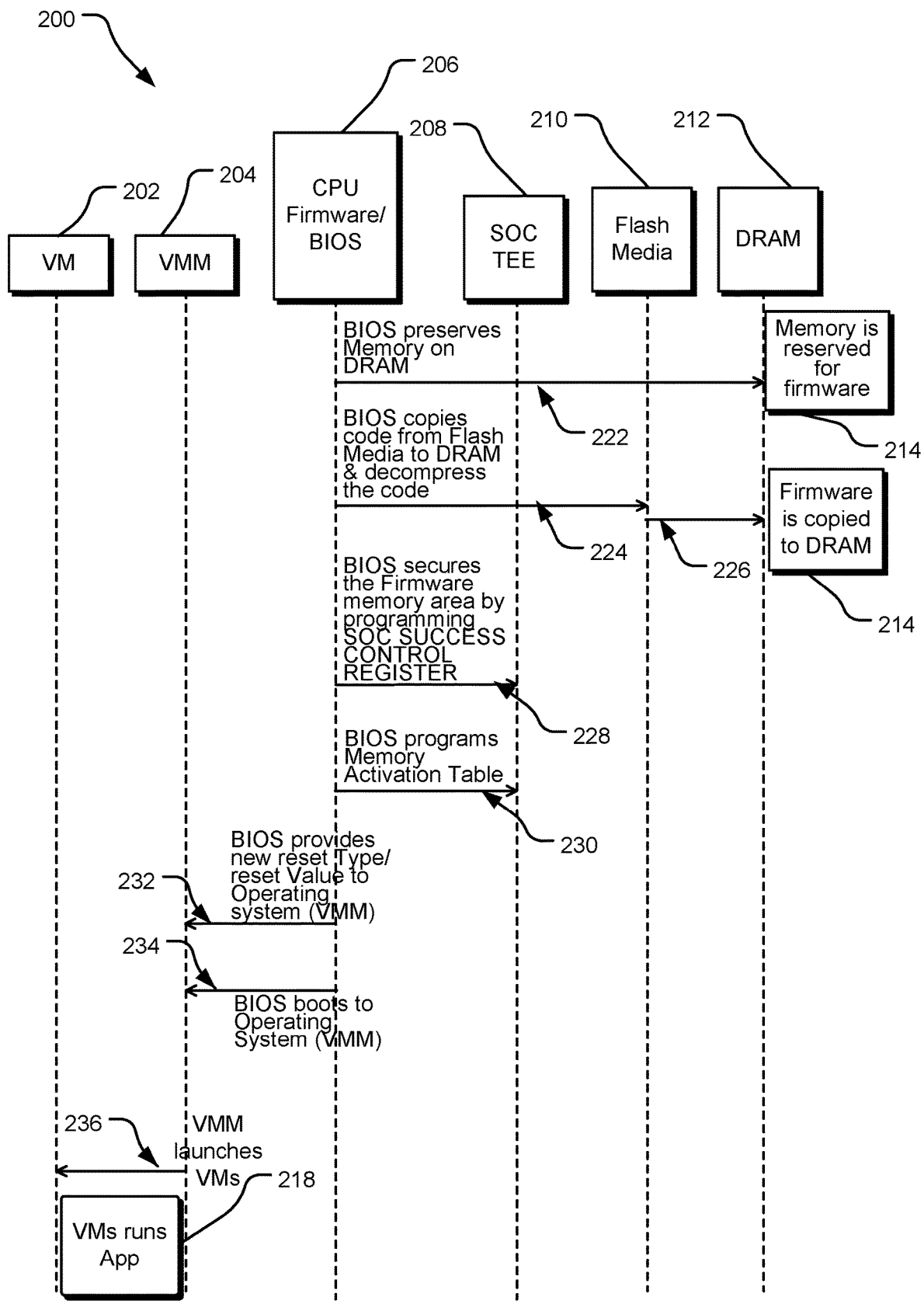
FIG. 2 illustrates an example state diagram of the processor restart management system disclosed herein.

FIG. 2 illustrates a state diagram 200 of the processor restart management system disclosed herein. Specifically, the state diagram 200 illustrates a boot flow sequence. At 222 a BIOS 206 preserves memory 214 on a DRAM 212 for firmware. At 224, the BIOS 206 copies firmware from a FLASH media 210 to the memory 214. Subsequently, at 226, the firmware is copied to the memory 214 on the DRAM 212. An operation 228 the BIOS 206 secures the firmware on the memory 214 of DRAM 212 by programming a SOC SUCCESS CONTROL REGISTER. Subsequently, at operation 230, the BIOS 206 programs a memory allocation table (MAT). At operation 232, the BIOS 232 provides new reset type/reset values to the operating system VMM 204. The VMM 204 launches VMs 202. Subsequently, the VMs 202 may runs one or more apps 218.

Figure 3:
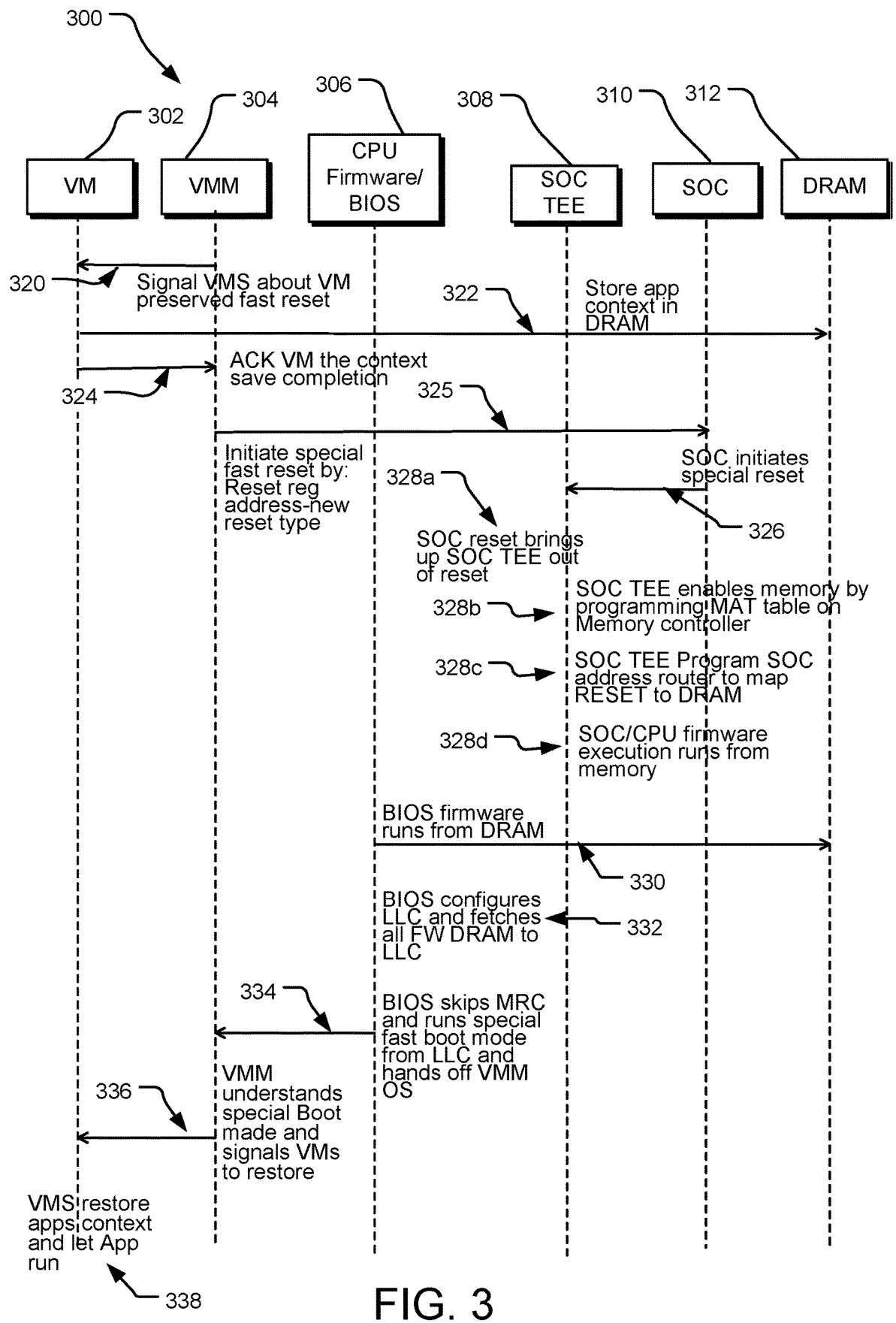
FIG. 3 illustrates alternative example state diagram of the processor restart management system disclosed herein.

FIG. 3 illustrates an alternative state diagram 300 of the processor restart management system disclosed herein. Specifically, the state diagram 300 illustrates a warm reset boot flow sequence with a firmware patching example. At operation 320, the VMM 304 signals the VMs 302 about a VM preserved fast reset. At operation 322, the VMs 302 stores an app context in the DRAM 312 and at operation 324 the VM 302 sends an acknowledgement about storing the app context to the VMM 304.

Subsequently, at operation 325, the VMM 304 initiates a special fast reset by resetting a reset register address to a new reset type and communicating it to the SOC 310. In response at 326, the SOC initiates the special reset by communicating with the SOC TEE 308. At operation 328a, the SOC TEE 308 is brought out of reset and at operation 328b, the SOC TEE 308 enables memory, such as DRAM 312, by programming a MAT table on a memory controller. Also, at operation 328c, the SOC TEE 308 programs an SOC address router to map the reset to the DRAM 312 and at an operation 328d, the firmware runs from the memory, such as from DRAM 312.

At operation 330, the BIOS firmware runs from the DRAM 312 and at operation 332, the BIOS 306 configures LLC for the SOC CPUs and fetches firmware from the DRAM 312 to the LLC. Subsequently, at operation 334 the BIOS 306 runs in a special fast boot mode from the LLC and hands off control to the VMM 304. At 336, the VMM 304 signals the VM to restore and in response at an operation 338, the VMs 302 restores applications context and lets the applications run.

Figure 4:
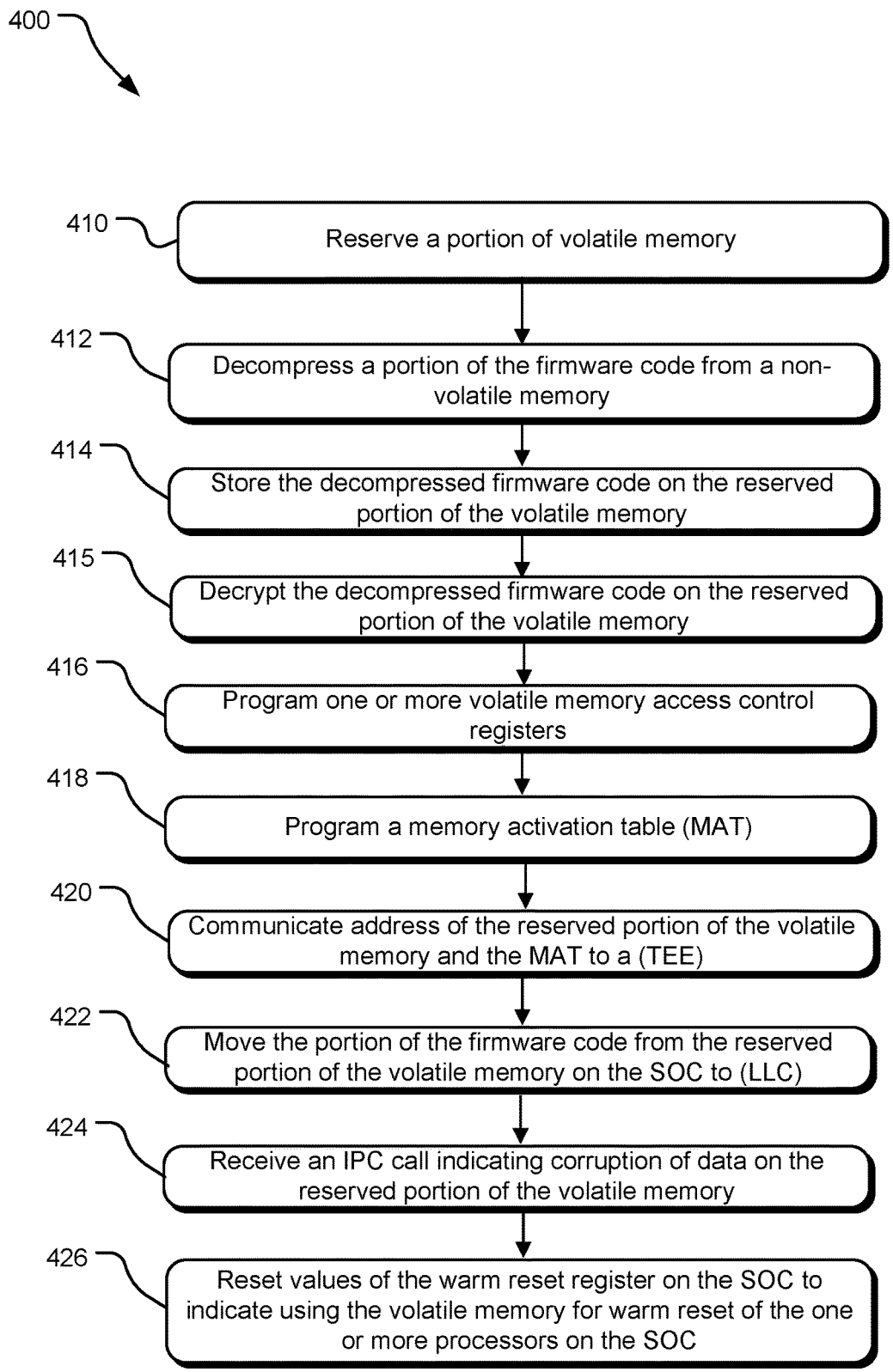
FIG. 4 illustrates example operations of the processor restart management system disclosed herein.

FIG. 4 illustrates operations 400 of the processor restart management system disclosed herein. An operation 410 reserves a portion of a volatile memory on a system on chip (SOC) including one or more processors. Subsequently, an operation 412 decompresses a portion of the firmware code from a non-volatile memory and an operation 414 stores the decompressed firmware code on the reserved portion of the volatile memory. In one implementation, an operation 415 may decrypt the decompressed firmware code on the reserved portion of the volatile memory. Specifically, decrypting the decompressed firmware code may include applying one or more decrypting algorithm on the decompressed software. Example decrypting algorithms may use an RSA public key to decrypt the decompressed software.

An operation 416 programs one or more volatile memory access control registers to remove write access to the reserved portion of the volatile memory. For example, volatile memory access control registers may be configured to have an "on" state which indicates that the write access is "on" for the reserved portion of the volatile memory. On the other hand, an "off" state of the volatile memory access control registers may indicate that the write access is "off" for the reserved portion of the volatile memory. The operation 416 may turn such registers on or off to control write access to the reserved portion of the volatile memory.

Subsequently, an operation 418 programs a memory activation table (MAT), wherein the MAT includes a set of memory access controller register addresses and values of the memory access controller register addresses. For example, the operation 418 may program the memory access controller register addresses of the MAT 110 by changing the value of such memory access controller register addresses. For example, a value of a specific memory access controller register address may be changed to setup the path to the DRAM 134 very early in a boot phase.

An operation 420 communicates an address of the reserved portion of the volatile memory and the MAT to a trusted execution engine (TEE) on the SOC. Subsequently, an operation 422 moves the portion of the firmware code from the reserved portion of the volatile memory on the SOC to last level cache (LLC) of the one or more processors.

In one alternative implementation, an operation 424 may receive an IPC call indicating corruption of data on the reserved portion of the volatile memory. In response to the IPC call, an operation 426 may reset values of the warm reset register on the SOC to indicate using the volatile memory for warm reset of the one or more processors on the SOC.

Figure 5:
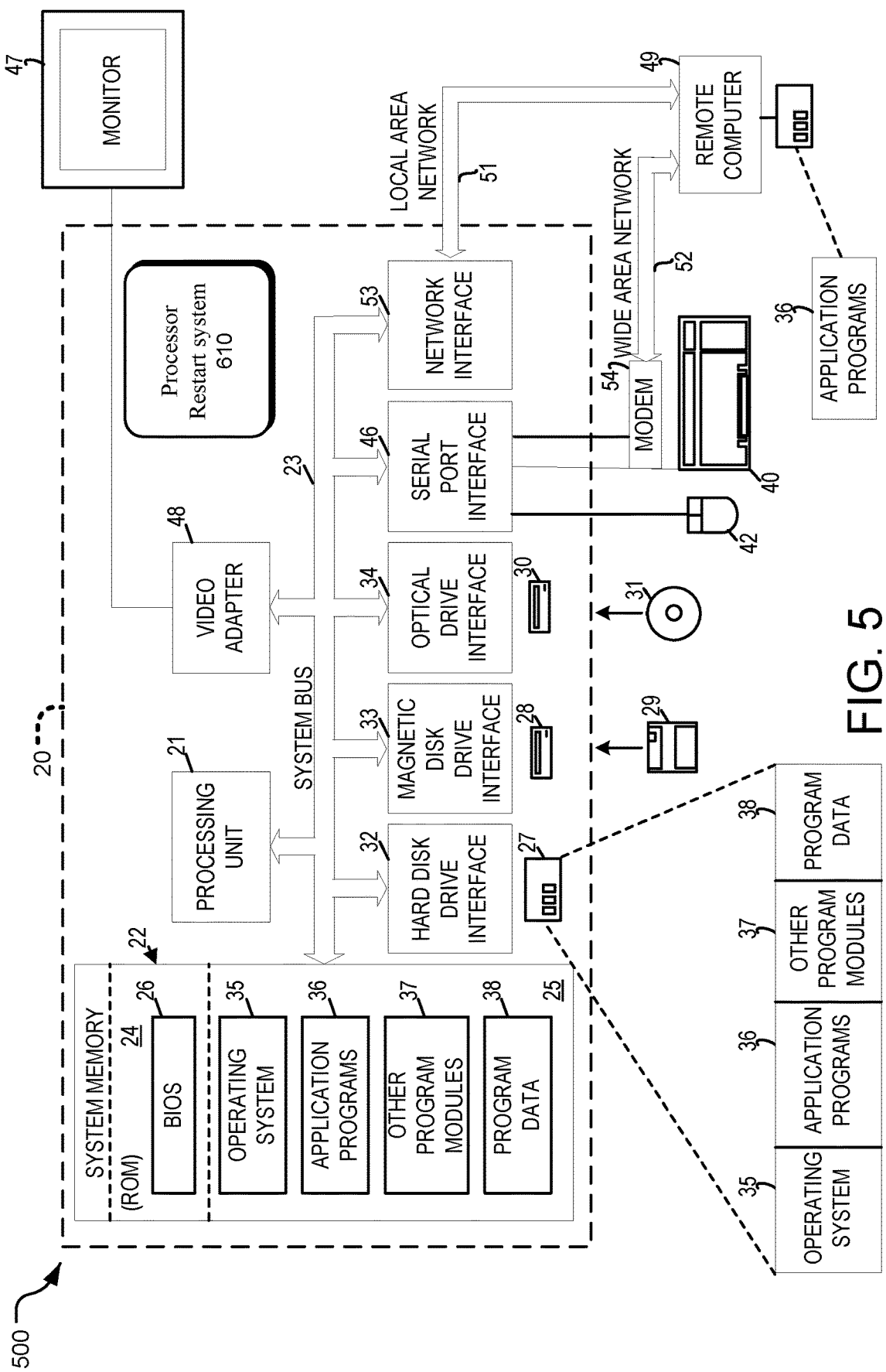
FIG. 5 illustrates an example system that may be useful in implementing the high latency query optimization system disclosed herein.

FIG. 5 illustrates an example system 600 that may be useful in implementing the high latency query optimization system disclosed herein. The example hardware and operating environment of FIG. 6 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 5, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory and includes read-only memory (ROM) 24 and random-access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a high latency query optimization system disclosed herein. In one implementation, a frequency unwrapping module, including instructions to unwrap frequencies based at least in part on the sampled reflected modulations signals, may be stored in memory of the computer 20, such as the read-only memory (ROM) 24 and random-access memory (RAM) 25.

Furthermore, instructions stored on the memory of the computer 20 may be used to generate a transformation matrix using one or more operations disclosed in FIG. 5. Similarly, instructions stored on the memory of the computer 20 may also be used to implement one or more operations of FIG. 1. The memory of the computer 20 may also one or more instructions to implement the high latency query optimization system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the processor system 510 may be stored in system memory 22 and/or storage devices 29 or 31 and processed by the processing unit 21. high latency query optimization system operations and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of high latency query optimization system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The high latency query optimization system disclosed herein may include a variety of tangible computer-readable storage media and intangible computer-readable communication signals. Tangible computer-readable storage can be embodied by any available media that can be accessed by the high latency query optimization system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the high latency query optimization system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

An implementation disclosed herein provides a method including reserving a portion of a volatile memory on a system on chip (SOC) including one or more processors, decompressing at least a portion of the firmware code from a non-volatile memory; programming one or more volatile memory access control registers to remove write access to the reserved portion of the volatile memory, programming a memory activation table (MAT), wherein the MAT includes a set of memory access controller register addresses and values of the memory access controller register addresses, and communicating an address of the reserved portion of the volatile memory and the MAT to a trusted execution engine (TEE) on the SOC.

An alternate implementation includes One or more physically manufactured computer-readable storage media, encoding computer-executable instructions for executing on a computer system a computer process, the computer process including reserving a portion of a volatile memory on a system on chip (SOC) including one or more processors, decompressing at least a portion of the firmware code from a non-volatile memory, programming one or more volatile memory access control registers to remove write access to the reserved portion of the volatile memory, programming a memory activation table (MAT), wherein the MAT includes a set of memory access controller register addresses and values of the memory access controller register addresses, communicating an address of the reserved portion of the volatile memory and the MAT to a trusted execution engine (TEE) on the SOC, wherein communicating an address of the reserved portion of the volatile memory comprises setting value of a reset register on the SOC and moving the portion of the firmware code from the reserved portion of the volatile memory on the SOC to a last level cache (LLC) of the one or more processors.

In another implementation the system disclosed here includes a memory, one or more processor units, and a processor restart system stored in the memory and executable by the one or more processor units, the service risk discovery system encoding computer-executable instructions on the memory for executing on the one or more processor units a computer process, the computer process including reserving a portion of a volatile memory on a system on chip (SOC) including one or more processors, decompressing at least a portion of the firmware code from a non-volatile memory, decrypting the decompressed firmware code on the reserved portion of the volatile memory, programming one or more volatile memory access control registers to remove write access to the reserved portion of the volatile memory, programming a memory activation table (MAT), wherein the MAT includes a set of memory access controller register addresses and values of the memory access controller register addresses, and communicating an address of the reserved portion of the volatile memory and the MAT to a trusted execution engine (TEE) on the SOC.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method, comprising:
reserving a portion of a volatile memory on a system on chip (SOC) including one or more processors;
decompressing at least a portion of the firmware code from a non-volatile memory;
programming one or more volatile memory access control registers to remove write access to the reserved portion of the volatile memory;
programming a memory activation table (MAT), wherein the MAT includes a set of memory access controller register addresses and values of the memory access controller register addresses; and
communicating an address of the reserved portion of the volatile memory and the MAT to a trusted execution engine (TEE) on the SOC.

2. The method of claim 1, wherein reserving a portion of volatile memory further comprises reserving a portion of a DRAM on the SOC.

3. The method of claim 1, wherein communicating an address of the reserved portion of the volatile memory comprises setting value of a reset register on the SOC.

4. The method of claim 1, wherein communicating an address of the reserved portion of the volatile memory comprises generating an inter-process communication (IPC) call to the TEE on the SOC.

5. The method of claim 1, further comprising caching the decompressed firmware code from the reserved portion of the volatile memory to last level cache (LLC) of the one or more processors.

6. The method of claim 1, further comprising:
receiving an IPC call indicating corruption of data on the reserved portion of the volatile memory; and
in response to the IPC call indicating corruption of data on the reserved portion of the volatile memory, resetting values of the reset register on the SOC to indicate using the volatile memory for reset of the one or more processors on the SOC.

7. The method of claim 1, wherein the TEE programs the memory access control registers of the MAT on a memory controller of the SOC.

8. The method of claim 7, wherein the memory access control registers of the MAT enable a memory controller on the SOC to access the reserved portion of the volatile memory.

9. One or more physically manufactured computer-readable storage media, encoding computer-executable instructions for executing on a computer system a computer process, the computer process comprising:
reserving a portion of a volatile memory on a system on chip (SOC) including one or more processors;
decompressing at least a portion of the firmware code from a non-volatile memory;
programming one or more volatile memory access control registers to remove write access to the reserved portion of the volatile memory;
programming a memory activation table (MAT), wherein the MAT includes a set of memory access controller register addresses and values of the memory access controller register addresses;
communicating an address of the reserved portion of the volatile memory and the MAT to a trusted execution engine (TEE) on the SOC,
wherein communicating an address of the reserved portion of the volatile memory comprises setting value of a reset register on the SOC; and
moving the portion of the firmware code from the reserved portion of the volatile memory on the SOC to a last level cache (LLC) of the one or more processors.

10. The one or more physically manufactured computer-readable storage media of manufacture of claim 9, wherein the computer process further comprising:
activating access to the volatile memory during a boot flow;
remapping a reset vector to the volatile memory;
loading code from the volatile memory; and
booting the one or more processors using the code from the volatile memory.

11. The one or more physically manufactured computer-readable storage media of claim 9, wherein communicating an address of the reserved portion of the volatile memory comprises generating an inter-process communication (IPC) call to the TEE on the SOC.

12. The one or more physically manufactured computer-readable storage media of claim 9, wherein the computer process further comprising, caching the decompressed firmware code from the reserved portion of the volatile memory to the last level cache (LLC) of the one or more processors.

13. The one or more physically manufactured computer-readable storage media of claim 9, wherein the computer process further comprising:
receiving an IPC call indicating corruption of data on the reserved portion of the volatile memory; and
in response to the IPC call indicating corruption of data on the reserved portion of the volatile memory, resetting values of the reset register on the SOC to indicate using the volatile memory for reset of the one or more processors on the SOC.

14. The one or more physically manufactured computer-readable storage media of claim 9, wherein the TEE programs the memory access control registers of the MAT on a memory controller of the SOC.

15. The one or more physically manufactured computer-readable storage media of claim 14, wherein the memory access control registers of the MAT enable a memory controller on the SOC to access the reserved portion of the volatile memory.

16. A system comprising:
a memory;
one or more processor units; and
a processor restart system stored in the memory and executable by the one or more processor units, the service risk discovery system encoding computer-executable instructions on the memory for executing on the one or more processor units a computer process, the computer process comprising:
reserving a portion of a volatile memory on a system on chip (SOC) including one or more processors;
decompressing at least a portion of the firmware code from a non-volatile memory;

decrypting the decompressed firmware code on the reserved portion of the volatile memory;
programming one or more volatile memory access control registers to remove write access to the reserved portion of the volatile memory;
programming a memory activation table (MAT), wherein the MAT includes a set of memory access controller register addresses and values of the memory access controller register addresses; and
communicating an address of the reserved portion of the volatile memory and the MAT to a trusted execution engine (TEE) on the SOC.

17. The system of claim 16, wherein reserving a portion of volatile memory further comprises reserving a portion of a DRAM on the SOC.

18. The system of claim 16, wherein communicating an address of the reserved portion of the volatile memory comprises setting value of a reset register on the SOC.

19. The system of claim 16, wherein communicating an address of the reserved portion of the volatile memory comprises generating an inter-process communication (IPC) call to the TEE on the SOC.

20. The system of claim 16, wherein the computer process further comprising caching the decompressed firmware code from the reserved portion of the volatile memory to last level cache (LLC) of the one or more processors.

* * * * *